US006587441B1

(12) United States Patent
Urban et al.

(10) Patent No.: US 6,587,441 B1
(45) Date of Patent: Jul. 1, 2003

(54) METHOD AND APPARATUS FOR TRANSPORTATION OF DATA OVER A MANAGED WIRELESS NETWORK USING UNIQUE COMMUNICATION PROTOCOL

(75) Inventors: Jeffrey Urban, Roselle, IL (US); Jeffrey Barhorst, Round Lake, IL (US); Christopher C. Solomon, West Chicago, IL (US); Herbert Edwards, Hoffman Estates, IL (US); Chris Oltrogge, Chicago, IL (US); Adam Albert, Schaumburg, IL (US)

(73) Assignee: Technology Alternatives, Inc., Schaumburg, IL (US)

( * ) Notice: Subject to any disclaimer, the term of this patent is extended or adjusted under 35 U.S.C. 154(b) by 0 days.

(21) Appl. No.: 09/379,674

(22) Filed: Aug. 24, 1999

Related U.S. Application Data

(60) Provisional application No. 60/116,856, filed on Jan. 22, 1999.

(51) Int. Cl.$^7$ ................................................. H04B 7/00
(52) U.S. Cl. .................. 370/310; 370/329; 370/395.51; 370/373
(58) Field of Search .................................. 370/392, 373, 370/395.51, 474, 471; 709/230, 246

(56) References Cited

U.S. PATENT DOCUMENTS 4,777,657 A    10/1988    Gillaspie

| 4,807,282 A | 2/1989 | Kazan et al. |
| 5,181,200 A | 1/1993 | Harrison |
| 5,228,074 A | 7/1993 | Mizikovsky |
| 5,390,365 A | 2/1995 | Enoki et al. |
| 5,408,520 A | 4/1995 | Clark et al. |
| 5,410,752 A | 4/1995 | Scholefield |
| 5,428,671 A | 6/1995 | Dykes et al. |
| 5,446,736 A | 8/1995 | Gleeson et al. |
| 5,479,396 A | 12/1995 | Kusano |
| 5,481,562 A | 1/1996 | Pearson et al. |
| 5,519,704 A | 5/1996 | Farinacci et al. |

(List continued on next page.)

Primary Examiner—Hassan Kizou
Assistant Examiner—D Levitan
(74) Attorney, Agent, or Firm—Greenberg Traurig; Paul F. McQuade

(57) ABSTRACT

A wireless, redundant, secure, real-time, network for a proprietary interactive data transfer system having a remote terminal and a host data center, such as an automated teller banking system, is disclosed. Controllers for the remote terminal and the host data center receive the proprietary language messages and packetize and encrypt the messages for sending over the best wireless carrier among the plurality of wireless carriers the controllers are connected to. The wireless control protocol monitors the communications to provide for selection of the most reliable communication carrier for any part of a transmission. Each network segment of the signal path has at least one state-controlled gate which reports the status of that signal path. Real time transmission and acknowledgment of securely packetized messages on wireless communications carriers via an object oriented coding control application provides for reliable datagram transfer independent of the reliability of any one signal path.

19 Claims, 11 Drawing Sheets

U.S. PATENT DOCUMENTS

| | | | |
|---|---|---|---|
| 5,532,939 A | 7/1996 | Psinakis et al. | |
| 5,535,191 A | 7/1996 | Park | |
| 5,544,222 A | 8/1996 | Robinson et al. | |
| 5,546,397 A | 8/1996 | Mahany | |
| 5,586,121 A | 12/1996 | Moura et al. | |
| 5,627,822 A | 5/1997 | Edmaier et al. | |
| 5,627,829 A | 5/1997 | Gleeson et al. | |
| 5,640,686 A | 6/1997 | Norimatsu | |
| 5,673,031 A | 9/1997 | Meier | |
| 5,673,322 A | 9/1997 | Pepe et al. | |
| 5,699,384 A | 12/1997 | Dillon | |
| 5,732,346 A * | 3/1998 | Lazaridis et al. | 455/406 |
| 5,761,240 A | 6/1998 | Croucher, Jr. | |
| 5,771,468 A | 6/1998 | Stein | |
| 5,796,727 A | 8/1998 | Harrison et al. | |
| 5,819,184 A | 10/1998 | Cashman | |
| 5,841,764 A * | 11/1998 | Roderique et al. | 370/310 |
| 5,862,183 A * | 1/1999 | Lazaridis et al. | 235/381 |
| 5,970,059 A * | 10/1999 | Ahopelto et al. | 370/338 |
| 5,978,386 A * | 11/1999 | Hamalainen et al. | 370/338 |
| 6,011,790 A * | 1/2000 | Fisher | 370/349 |
| 6,018,770 A * | 1/2000 | Little et al. | 709/223 |
| 6,137,800 A * | 10/2000 | Wiley et al. | 370/258 |
| 6,304,564 B1 * | 10/2001 | Monin et al. | 370/338 |

* cited by examiner

Packet Definitions

A. Initialization Packet (5 Byte Header / 0 Byte Payload)

| Packet Information | xxx0 0000 |
|---|---|
| Sequence Number | XXXX XXXX |
| Circuit ID | XXXX XXXX |
|  | XXXX XXXX |
| Version Number | XXXX XXXX |

Version Number Definitions
    1-Version 2.X
    2-Version 3.0

B. Single Packet (4 Byte Header / n Byte Payload)

| Packet Information | xxx0 0001 |
|---|---|
| Sequence Number | XXXX XXXX |
| Circuit ID | XXXX XXXX |
|  | XXXX XXXX |
| Data Payload (n Bytes) | XXXX XXXX |

C. Multi Packet (6 Byte Header / n Byte Payload)

| Packet Information | xxx0 0010 |
|---|---|
| Sequence Number | XXXX XXXX |
| Circuit ID | XXXX XXXX |
|  | XXXX XXXX |
| Total Packet Number | XXXX XXXX |
| Packet Sequence Number | XXXX XXXX |
| Data Payload (n Bytes) | XXXX XXXX |

Figure 4
(Continued on next page)

Packet Definitions

A. Initialization Packet (5 Byte Header / 0 Byte Payload)

| Packet Information | xxx0 0000 |
|---|---|
| Sequence Number | XXXX XXXX |
| Circuit ID | XXXX XXXX |
|  | XXXX XXXX |
| Version Number | XXXX XXXX |

Version Number Definitions
    1-Version 2.X
    2-Version 3.0

Figure 4a

B. Single Packet (4 Byte Header / n Byte Payload)

| Packet Information | xxx0 0001 |
|---|---|
| Sequence Number | XXXX XXXX |
| Circuit ID | XXXX XXXX |
|  | XXXX XXXX |
| Data Payload (n Bytes) | XXXX XXXX |

Figure 4b

C. Multi Packet (6 Byte Header / n Byte Payload)

| Packet Information | xxx0 0010 |
|---|---|
| Sequence Number | XXXX XXXX |
| Circuit ID | XXXX XXXX |
|  | XXXX XXXX |
| Total Packet Number | XXXX XXXX |
| Packet Sequence Number | XXXX XXXX |
| Data Payload (n Bytes) | XXXX XXXX |

Figure 4c

D. Ack Packet (4 Byte Header / 0 Byte Payload)

| Packet Information | xxx0 0011 |
|---|---|
| Sequence Number | XXXX XXXX |
| Circuit ID | XXXX XXXX |
|  | XXXX XXXX |

Figure 4d

E. Resend Packet (4 Byte Header / n Byte Payload)

| Packet Information | xxx0 0100 |
|---|---|
| Sequence Number | XXXX XXXX |
| Circuit ID | XXXX XXXX |
|  | XXXX XXXX |
| Data Payload (n Bytes) | XXXX XXXX |

Figure 4e

F. Token Packet (5 Byte Header / 0 Byte Payload)

| Packet Information | xxx0 0101 |
|---|---|
| Sequence Number | XXXX XXXX |
| Circuit ID | XXXX XXXX |
|  | XXXX XXXX |
| Status | 1234 5678 |

Bit 1 of the Status byte determines if the Token Packet is a Command or an Acknowledgement.
- 0 - Command
- 1 - Ack Bit 2 through 4 are currently not used
Bits 5 through 8 denote the status.
- 0 - Open
- 1 - Close

Figure 4f

METHOD AND APPARATUS FOR TRANSPORTATION OF DATA OVER A MANAGED WIRELESS NETWORK USING UNIQUE COMMUNICATION PROTOCOL

This application claims the benefit of Provisional application Ser. No. 60/116,856, filed Jan. 22, 1999.

BACKGROUND OF THE INVENTION

1. Field of the Invention

This invention relates to the transportation of data from one or more remote wireless terminals to one or more central hosts. It uses a system comprised of a managed, virtually constructed, wireless network and a communication protocol including a system of routing across unlike networks. The communication protocol is independent of the underlying physical network.

2. Discussion of Related Art

In the United States and Internationally, electronic commerce markets today are experiencing a fundamental shift from wired to wireless communications. This shift is being driven by the compelling economic advantage of wireless communication. Revenues can be increased through greater functionality and flexibility in remote terminal locations. The primary example used in this document is of financial institutions offering banking services to their customers by opening bank branches and deploying ATMs (Automated Teller Machines) at locations that allow them to reach their customers at sites remote from the main facility. Other industries also depend on secure, reliable data collection from remote locations including, but not limited to, security systems, health care, insurance, sales/service force management, and retail.

In the example of financial institutions, banking practice requires each ATM to communicate in real time with bank computers to confirm customer identities and associated banking privileges. This communication has heretofore been facilitated by increasingly costly and/or complex methods.

Initially the communication was done through the use of hard-wired methods. Leased Lines are expensive, take a long time to deploy, are maintenance heavy, and have no provision for redundancy unless more than one line is run. ISDN lines frequently require changes to the central host system and reprogramming and retraining of staff. ISDN lines have no ability to manage and monitor the remote terminal, have low reliability, unpredictable costs, inflexible transmission speeds and lower security of data. Dial-up telephone lines also require changes to the central host system, and carry disadvantages including the inability to manage and monitor the remote terminal, low reliability, unpredictable costs, slow transmission speeds and lower security. All of these hard-wired methods require coordination with multiple regional telephone companies simply to achieve national coverage. As today's industries grow into larger multi-regional or national entities, the hard-wired methods of connection of a remote terminal to the central host system become unmanageable and prohibitively expensive.

To reach terminals in more remote or transient locations, to more quickly deploy communications to remote terminals and to process more transactions, and to reduce the number of transactions lost due to communications failures, the communications path needs to be more reliable than ISDN, Dial-Up or Native Wireless communications. Greater reliability also allows for the implementation of an increased variety of transaction applications, as many of the new applications are more data-intense and require more reliable communications simply to succeed. Therefore, many industries including banking, turned to cellular communications, proprietary radio communications and satellite communications to deliver remote terminal communications. The ability to reach remote terminals in more remote or transient locations increased the number of terminals. Reaching terminals more quickly allowed remote users to be connected and productive sooner. Both contribute to larger transaction volumes. However, the native cellular, radio and proprietary communications technologies have associated problems.

Circuit switched cellular communications have the same problems as dial-up lines, including required changes to the central host system, inability to manage and monitor the remote terminal, lower reliability and security, unpredictable monthly costs and slow transaction speeds. In addition, circuit switched cellular communications are more expensive and less reliable than dial up due to the high pricing structure and the inherent unreliability of the cellular network. Finally, the cellular networks are regional or metropolitan based, with no single cellular network providing nationwide coverage for all types of protocols.

Proprietary radio communications share most of the problems of cellular communications. Proprietary radio offers lower monthly communication costs, but this is offset by the high start up cost associated with building the proprietary radio towers to establish communications. In addition, the ability to locate and or relocate a remote terminal site is limited by the proximity to the tower set up for communications.

Satellite communications offer nationwide coverage as opposed to the regional coverage offered by cellular or radio communications. Satellite communications typically offer network-like bandwidth. However, because satellite networks are often designed more for data transmission than for transaction processing, there are problems associated with processing transactions via satellite links. The latencies inherent in the data transmission based satellite network are frequently incompatible with the time delay tolerances set up by network transport protocols for the purpose of maintaining the integrity of the transaction. These latencies are exacerbated as the system seeks to recover lost data.

In addition to the problems listed above with various communication devices and methods, the current standard protocols (e.g. TCP/IP, X.25, 3270, SNA/SDLC (Systems Network Architecture/Synchronous Data Link Control) and others) have additional problems that exacerbate their ability to transport data securely and reliably over the wireless network. Protocols define the rules of interaction between devices attached to the network. These standard protocols are limited in their effectiveness over the wireless networks because of inadequacies in working within time constraints, inadequacies in security, inability to communicate with dissimilar protocols and network topologies, and the unavailability of single, national network supporting CDPD (Cellular Digital Packet Data), GSM (Global System for Mobile communication), and G3 (generation 3) wireless protocols.

While there are national wireless networks available, BellSouth Intelligent Wireless Data Networks (BSWD Mobitex) is not compatible with other standard protocols used by older host systems, thus requiring expensive and extensive upgrading of the entire host system. The national wireless networks, Hughes network, Space net and BSWD Mobitex all share the problem of latencies in the network and reliability problems in actual use. Another wireless transport protocol, UDP/IP, has the additional problem of data loss during the communication process. None of the standard devices and methods of wireless data transportation have the ability to transition between different transport protocols or across different wireless networks.

Because many remote terminal applications are driven by host computers resident on older infrastructures, the host computers use different protocols than those supported by the wireless networks. In order for a wireless communication to get to the host computer, there must be a conversion from the wireless protocol to the host protocol. Even where an application is written to work on a wireless network, differences in the protocols supported by the different wireless networks render the communication ineffective on different wireless networks. For example, many of the current networks use the TCP/IP protocol, but the BSWD Mobitex system does not accept that method and has devised a separate protocol. Thus, an application written to communicate over TCP/IP would be ineffective over a BSWD Mobitex network. This limits the applicability of wireless networking to usability over a single communication network and forces the host to accept that network's limitations.

Previously, no combination of communication network and protocol offered easy seamless and reliable communications from remote and mobile locations. The simple definition of the path from the remote device to the host could be challenging when the two devices were attached to different networks using different protocols. There are few devices available that perform protocol conversions between communicating devices in dissimilar network environments. Of those devices that do perform protocol conversions, they all fall short of the need to connect remote communicating devices quickly because of their inability to resolve the inherent losses of data communications over the wireless network. The navigation of transaction data over the wireless networks and then over the native host networking environment is difficult and unreliable.

Therefore, to overcome the limitations of the wireless communications strategies and provide easy, seamless redundancy, what is needed is a method of operating a managed wireless network and an embedded protocol that improves the performance, reliability, and coverage area of wireless networks for the electronic commerce host and its customers.

SUMMARY OF THE INVENTION

The present invention discloses means and method for reliable real time transmission between multiple host system remote terminals and host server terminals of proprietary design. The invention uses independent modules at the host and remote terminals which overlay the proprietary host language in order to transmit secure datagrams over a multiplicity of real time wireless carriers. The invention verifies message receipt and monitors transmission link reliability in order to select the most reliable channels for message transmission. Nonperforming channels are shut down throughout the system to prevent faulty or incomplete transactions between the host and remote terminals.

The remote terminal module and host server module are essentially mirror image signal paths which, via embedded software objects, strip the transmission headers from the outbound terminal messages, and packetize, encrypt, and reformat the message package as "data" within a wireless control protocol managing the data flow, control, receipt, and state management within a virtual wireless network. It will be appreciated that each time a header is stripped from the message the network segment connection is terminated. The reformatted messages are then again formatted for sending over a selected one of a plurality of known wireless carriers to which the virtual network subscribes. At the in-bound module the message is identified, unformatted, unencrypted, acknowledged as received, routed, and reformatted for suitable communication to the proprietary host system. Should the transmission fail, the failed channel is shut down by the state management system and the message is resent over the alternate wireless carrier. If the alternate message transmission fails, the host system terminals are notified and shut down. It will be appreciated that a great number of alternate transmission links may be enabled by the present invention and that the transmission systems need not necessarily be wireless.

Generally, the present invention creates three network segments in the signal path, or circuit, from the remote terminal to the server terminal of the host. A remote terminal network segment exists from the remote terminals to the remote terminal control module. A wireless network exists between the remote terminal control module and the server control module utilizing redundant wireless carrier connections. A host server network segment exists between the server control module and the host server. The network segments are intelligently linked by channel management objects in the software within each control module. Therefore, each network segment is aware of the others' status and message transmission can be regulated and controlled throughout the circuit even though the wireless network segment is, in essence, undefined until the time of message transmission.

Further, by utilizing the wireless control format of the present invention, any wireless transmission system can be accommodated because the wireless control format overlays its own addressing layer, including a logical address, onto transmitted messages. Thus, the wireless control format can still provide the ability to service multiple logical connections through a particular network segment, whether the transmission system of that segment has provided for logical addressing or only for physical addressing. For instance, a plurality of grouped automated teller machines (ATMs) may be conveniently remotely located and communicated with utilizing only one wireless transmission apparatus running a transmission application which supports only physical addressing.

Thus, it is among the objects of the present invention to provide a wireless control protocol for a redundant wireless network link between proprietary host terminals.

It is a further object of the present invention to provide a module, or modules, overlaying the proprietary host terminals and providing for communication through a secure, redundant, wireless, real time network for communications between the proprietary remote and server terminals.

It is a further object of the present invention to provide means and method for such a redundant wireless network which manages communication between the remote and server terminals according to receipt or non-receipt of message traffic between the host terminals.

BRIEF DESCRIPTION OF THE DRAWINGS

The described and further advantages of the present invention may be further clarified by the accompanying drawing and their description in which like parts are identified by like reference numbers.

FIG. 4 illustrates the six types of packets needed for the wireless control protocol: Initialization, Single, Multi Packet, Acknowledgment, Resend and Token.

DETAILED DESCRIPTION OF THE PRESENTLY PREFERRED EMBODIMENTS

Figure 1:
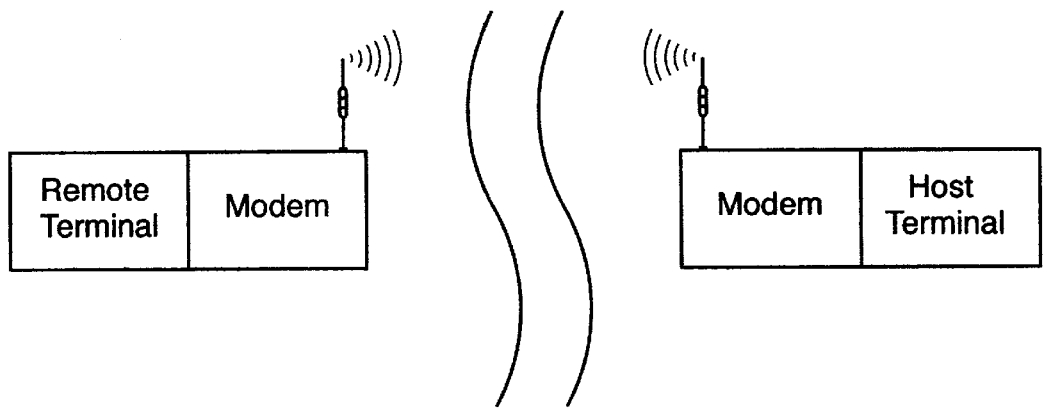
FIG. 1 illustrates prior art solutions for remote ATM connection with a host server.
Figure 2:
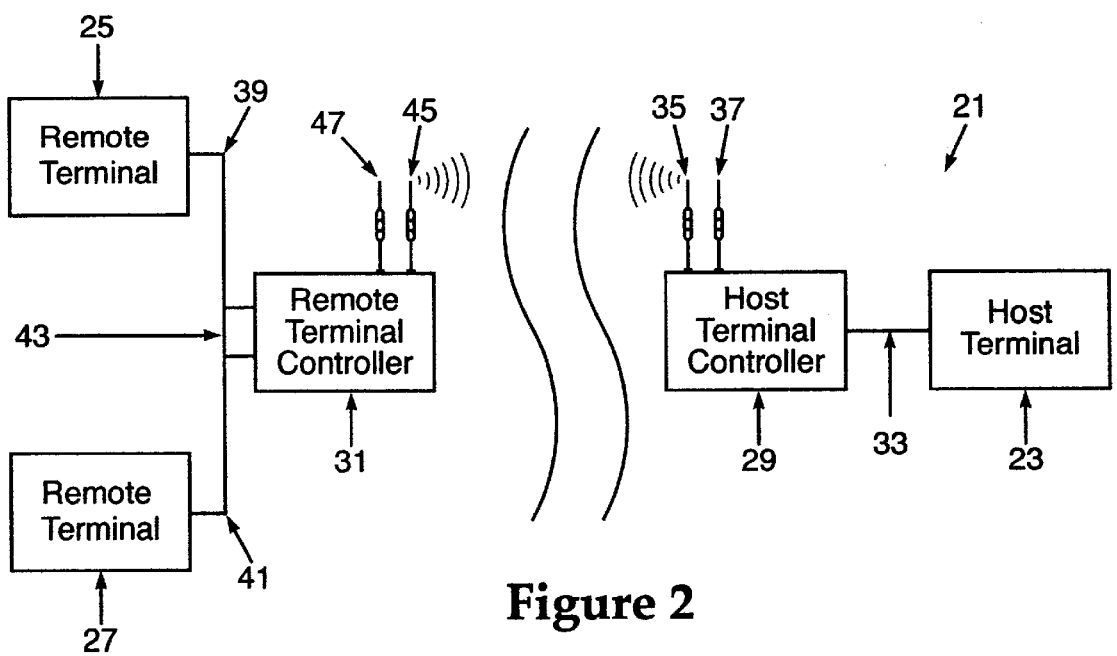
FIG. 2 illustrates the general concept of the redundant wireless network of the present invention.

Referring to FIG. 2, a virtual wireless network 21 according to the present invention provides a proprietary host server terminal 23 and first and second remote terminals 25, 27 with a server terminal control module 29 and a remote terminal control module 31. For convenience of description the server terminal will be designated the upstream end of the signal chain. The server terminal control module 29 is in data communication at its upstream or terminal side with the host server 23 typically through a connection-oriented communication protocol, e.g., SNA/SDLC, over a land line 33. The server terminal control module 29 is equipped at its downstream, or wireless, side with apparatus for a plurality of wireless transmission carriers represented by first and second wireless communication means 35, 37, respectively, of differing topologies, or formats.

Examples of known wireless communication formats are BSWD Mobitex, CDPD, and VSAT (Very Small Aperture Terminal) which may be provided by various commercial entities for wireless transmission services.

The remote terminal control module 31 is in data communication at its downstream, or terminal, side with a plurality of remote terminals represented by the first and second remote terminals 25, 27; typically, although not necessarily, through a connection-oriented communication protocol, e.g., TCP/IP or Burroughs Async, via land lines 39, 41. The group of remote terminals may be interconnected via an ethernet network or the like, represented by dotted arrow 43, and communicate with the remote terminal controller 31 via a single line connection. The remote terminal control module 31 is equipped at its upstream, or wireless, side with a plurality of wireless transmission carriers represented by first and second wireless communication means 45, 47 matching those of the wireless, or interchange, side of the server terminal control module 29 for communication therewith.

Figure 3:
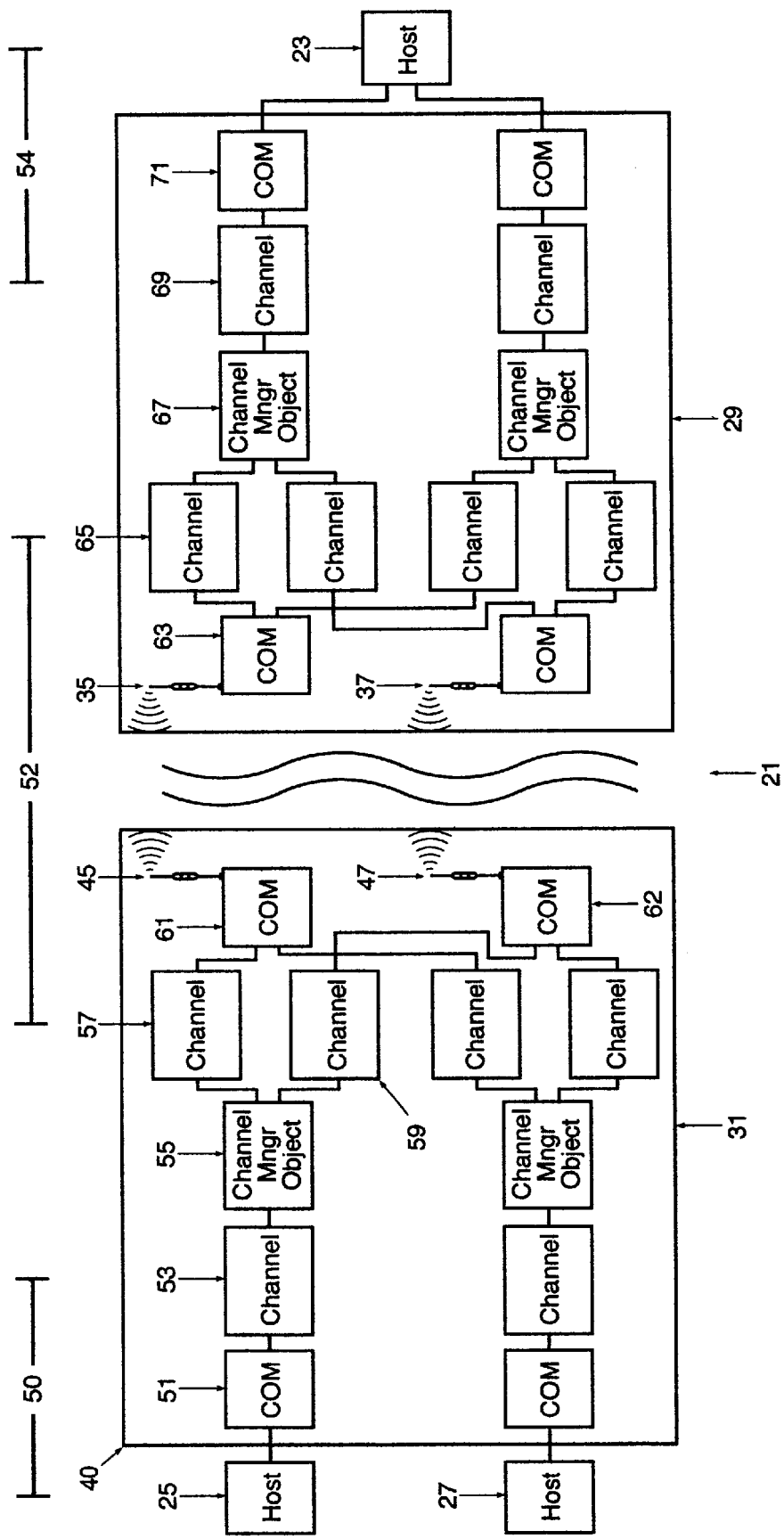
FIG. 3 is a diagram of the Data Flow between the Remote Terminal and the Host server terminal showing the terminal controller modules.

Referencing FIG. 3, the circuit, or signal path, between the server terminal 23 and one remote terminal 25 will be detailed with emphasis on uninterrupted data flow through the software objects contained within the digital electronics of the terminal control modules 29, 31.

Each control module 29, 31 essentially creates a mirror image signal path for message movement. Thus an incoming signal to either module will be treated essentially the same in each module, as will an outgoing signal. Each control module 29, 31 preferably comprises a virtual signal path of embedded functional software objects including terminal side Channel and Com Object pairs dedicated to each host system terminal and alternate, or multiple, interchange side Com and Channel pairs, with each dedicated to a selected wireless communication means. Although interchange between the two terminal controllers is shown as wireless, it will of course be appreciated that wired data carriers could also be used within the context of the present invention. Between the terminal side Channel/Com pairs and the interchange side Channel/Com pairs, and in communication therewith, are the Channel Manager Objects.

While the physical layout of FIG. 3 is shown as two modules between two host system terminals, it is useful in some aspects to think of the signal path or network as having three network segments: a remote terminal network segment 50 encompassing communications with the remote terminal; a wireless network segment 52 encompassing wireless communications between the control modules; and a host server network segment 54 encompassing communications with the host server. The Channel Manager Objects then link each of the three network segments together.

A customer transaction requires real time communication between the remote terminal 25 and the host server 23. The customer enters the request at the remote terminal. The request or corresponding instructions from the server 23, with all components thereof will be referred to hereinafter as a message. The message, in the proprietary format of the host system, is then formatted in the connection-oriented communication protocol, e.g. TCP/IP, for transmission over the land line 39 to the terminal side 49 of the remote terminal control module 31. The message from the remote terminal 25 is received on the terminal side by the software object Com 51 and has the connection oriented land line transmission protocol, e.g., TCP/IP, headers and the like, removed by the Com object 51. At this point the message is bare and consists only of address data and transaction data in the host proprietary language. The terminal side Com Object 51 then sends the message to its paired Channel Object 53. Each Channel Object in the signal chain will check the circuit addresses and validate the source, i.e. the sender, of the incoming messages. The Channel Objects of the control modules act in one capacity as state-controlled gates of the signal path, as further explained below. In the present instance the terminal side channel object 53 of the remote terminal control module 31 may be considered a pass-through object, although additional. functionality may be added to accommodate other data flow scenarios outside the scope of the present invention.

The Channel Manager Object 55 then polls its interchange side first and second channel objects 57, 59, respectively, and accepts the bare data message provided there is an OPEN Channel Object upstream, or outbound, to pass the message to. The message is assigned by the Channel Manager Object 55 to the OPEN Channel Object 57, 59 with the highest priority, as set by the system administrator, software application, or default. The wireless-side channels 57, 59 are uniquely associated with one form of wireless communication means 45, 47. The bare message is taken by the selected Channel Object, e.g., 57, and given a wireless control format header to make a packet in preparation for transmitting via the associated wireless transmission means, including., e.g., the first interchange side Com Object 61 of the remote terminal control module 31, if that is an OPEN channel with the highest priority. If not, the packet is sent to the alternate Com Object in preparation for sending by the second wireless transmission means 47.

The wireless control protocol header is placed at the front of all wireless transmission packets between modules 31, 29 in order to address the message with both physical and logical addresses and track receipt of transaction messages and all other wireless traffic, as further explained below. With the assignment of a wireless control header the bare message has become a packet and entered the wireless network segment of the signal path, which is controlled by the wireless control protocol. The Channel Object 57 further parcels the message into more than one packet if the message exceeds the maximum transmission unit length for the wireless network being used.

In addition to its packetization duties, the Channel Object 57 further maintains its function as a state-controlled gate in the signal path. The Channel Object 57 may also be assigned additional functions such as inbound message authentication or other additional functionalities as dictated by other data flow scenarios outside the scope of the present invention.

The packet, i.e., a wireless control protocol header and the original addressing and message from the remote terminal which is now treated as a data field at the end of the packet, is handed to the first interchange side Com Object 61 to prepare it for wireless transmission, provided this particular path of the wireless network segment is OPEN upstream. The Com object 61 will encrypt the packet by known methods such as encryption programs available from RSA Data Security Incorporated. The remote terminal interchange side Com Object 61 then adds the wireless communication format headers, e.g. for BSWD Mobitex, and checks packet lengths against the wireless communication for maximum transmission unit length. The Com Object 61 then places the packetized message onto the first wireless transmission carrier means 45 for sending to the server control module 29. The associated Channel Object 57 initiates at least one transmission timer waiting for an acknowledgment that the packet or packets were received by the server module 29, as further explained below.

The packet, with the wireless communication format headers, the wireless control protocol header, and the base message contained therein as data, is received at the server terminal control module 29 by the first physical wireless communication means 35 and the first interchange side Com Object 63 of the server terminal control module 29. The wireless communication format headers are stripped from the packet. The interchange side Com Object 63 first decrypts the packet then reports the address of the packet to the interchange side Channel Object 65. The Channel Object 65 compares the address of the packet in the wireless control format header to its list of valid channel addresses to determine if the packet is for a valid channel within that server terminal control module 29. If not, the packet is discarded. If a valid address is present in the wireless control format header the Channel Object 65 generates and the Com Object 61 sends to the remote terminal control module 31 an acknowledgment that the packet was received and the intended Channel Object is in the OPEN state. The Channel Object also assembles multipacket messages. If not all packets of a multipacket message were received, a Request to Resend the missing packets is sent. The Channel Object 65, upon comparing the remote physical and logical addresses as reported by the Com Object 63, if a match is found, removes the wireless control protocol header and passes the bare message to the Channel Manager 67 of the server terminal control module 29. The Channel Manager 67 then sends the bare message to the terminal side Channel Object 69 associated with the correct host application. Again, the terminal side channel 69 of the server control module 29 is essentially a pass through or place holder device in the context of the present invention. The Channel Object 69 forwards the base message to its paired terminal side Com Object 71. The terminal side Com Object 71 then constructs the message with appropriate headers for the land line communication format, or protocol, to the server 23. At that point the "data" of the packetized transmission, i.e., the original message from the remote terminal 25, is read and responded to by the server 23 in the reverse, or downstream, direction through the signal path.

The wireless control protocol is implemented as a state machine application to control message transfer through each Channel Object and to ensure reliable message transfer throughout the wireless network. A discussion of the wireless control protocol and the message packet headers used during its implementation follows.

FIG. 4 shows the six types of packets used to implement the wireless control protocol. They are: Initialization, Single Data, Multi-Data, Acknowledgment, Resend, and Token, packets. All packets used in the wireless control protocol begin with the same three fields. These three fields constitute the wireless control protocol header. The first field in the header is the Packet Information Field, followed by the Sequence Number field and the Circuit Identification field.

The Packet information field conveys the type of packet being sent. It can further be used to denote the existence of an extended header which will allow for future expansion of the header frame.

The Sequence Number field conveys a unique identifier for each packet to prevent packet duplication. For example, if an acknowledgment message is lost and data is retransmitted, it is possible for the receiving side to receive two copies of a packet. The sequence number is used to keep a history of what has been received and propagated so that the second copy may be discarded. The sequence number further allows the Channel Object to enforce packet sequence propagation ordering. This allows the packets to be delivered to the receiver in the same order as they were sent.

The Circuit Identification field conveys the unique circuit path which the packet is to travel. This identifier allows the mux/demux capability for multiple Channel Objects to use the same Com Object. It is this field that the Com Object matches it's internal mask, or template, against to determine which circuit the data belongs to, thus allowing the Com Object to demux a data stream across multiple channels. The mux/demux mechanism also provides a measure of security because the proper header with the proper Circuit ID needs to be on the data for it to be validated by the Channel Object and passed through a given circuit.

The first data packet type is the Initialization Packet (A). It is sent when initializing a channel any time a channel is moving from offline to ONLINE. It is used both to negotiate the version of the wireless protocol that will be used and to reset the sequence number of the receiving channel to maintian proper sequencing. This packet contains the wireless control protocol header and a one byte protocol version number field. The Packet Type subfield in the Packet Information field is set to binary XXX0 0000. Following this are the Sequence Number and the two byte Circuit Identification fields. The protocol Version Number is the last field.

The second type of data packet is the Single Packet (B). The Single Packet (B) is used to carry data between devices when the data will fit in one packet. This packet contains the wireless control protocol header and an n byte payload field. The Packet Type is set to binary XXX0 0001. Following the Packet Type designation field are the Sequence Number, the WEC Circuit Identification and the variable length Data fields.

The third type of packet is the Multi Packet. This is used when the data to be sent will not fit into a Single Packet. This packet contains six fields, a six-byte header and n byte payload. The Packet Type is set to binary XXX0 0010. The fields following the Circuit Identification field are the Total Packet Number field which indicates the total number of Multi Packets to be sent, the Packet Sequence Number field which gives the place of this packet within the string of packets comprising the message, and the variable length Data Payload.

The fourth type of packet is the Acknowledgment Packet (ACK). This packet is sent from the receiving module to acknowledge the receipt of a packet. It contains the three header fields common to all packets, making a four byte header and 0 byte payload. The Packet Type is set at XXX0 0011.

The fifth type of packet is the Resend Packet. This packet is used to request the retransmission of specific packets that were sent in Multi Packets but not received. The Packet Type is set at XXX0 0100. It contains the wireless control protocol header and an n byte payload field with each byte containing the Packet Sequence Number of a missing packet.

The sixth type of packet is the Token Packet. The Packet Type is set at XXX0 0101. There is no data payload. This packet type is used to test the system i.e. polling, and is a "heartbeat", i.e. a polling signal sent at intervals to check the network connections. The heartbeat contains operating state information necessary for maintaining synchronization between the two sides of the wireless network segment. The Token Packet is used to propagate state information throughout the signal chain. It is also used in the polling and acknowledgment activity of the protocol which continuously monitors the signal path status during any time of message nontransmission. Accordingly, the Token packet can be set as either a command or acknowledgment. After the wireless control header fields is a one byte Status field composed of 8 bits. Bit 1 determines if the Token Packet is a command (propagation), set at 0, or an Acknowledgment (status report), set at 1. The Acknowledgment of the Token Packet, or Acknowledgment Token, acknowledges a state change command rather than a packet transmission. There is always a packet acknowledgment (Acknowledgment Packet) sent for every Token Packet whether it is a command or an acknowledgment. Bits 2 through 4 are not currently used. Bits 5 through 8 denote the status, with 0000 as OPEN and 0001 as CLOSE.

State control for the Channel Objects is based on the sending module receiving an Acknowledgment Packet from the receiver that the sent packet was received by the receiving module. Generally, if no Acknowledgment Packet is received, the protocol issues a command to change the Channel Objects states from OPEN to CLOSE or Offline.

Figure 5:
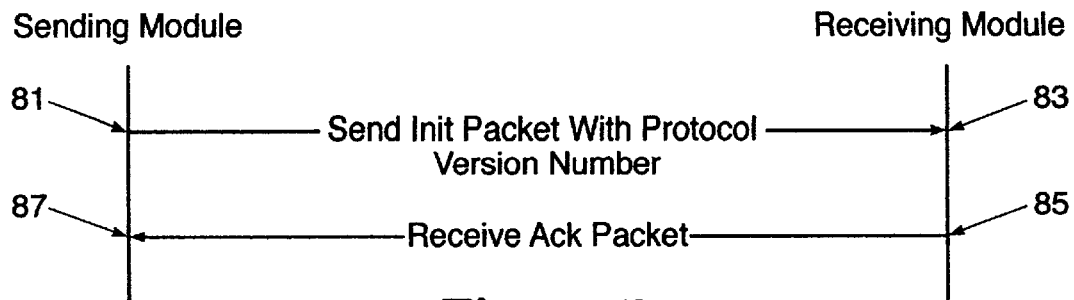
FIG. 5 illustrates the flow diagram of the normal exchange of the Initialization Packet between controller modules.

FIG. 5 illustrates the pathways used in initializing communication between two terminal control modules. It will be understood that communication between the modules is bidirectional and the direction of the illustrated path is for explanatory purposes only. Either module can send an Initialization Packet to the other. The Initialization Packet is sent upon first starting the system or at any transition from OFFLINE to ONLINE status. The Initialization Packet indicates the version of the wireless control protocol the sender expects to use. Upon receipt 83 of the Initialization Packet, the receiver resets its sequence number and responds with an Acknowledgment Packet 85 which is received by the sender. Both modules (29, 31, FIG. 3) are now set to the same sequence number, allowing any data loss to be detected and avoiding out of sequence errors when one side of the connection is reset. If the Initialization Packet is not acknowledged after a prescribed number or time of retries, then a change of state command Token is sent and the channel changes to the OFFLINE state.

Figure 6:
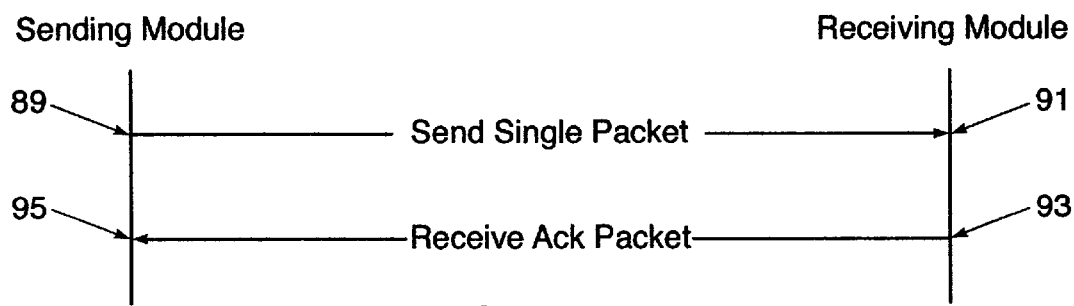
FIG. 6 illustrates the flow diagram of a successful transmission of a Single Packet message

FIG. 6 illustrates successful transmission of a single data packet. The sending module sends 89 the Single Packet. When the Single Packet is received 91, the receiver (E) responds 93 with an Acknowledgment Packet which is received 95 by the sender. The channel objects remain OPEN, no change of state is necessary.

Figure 7:
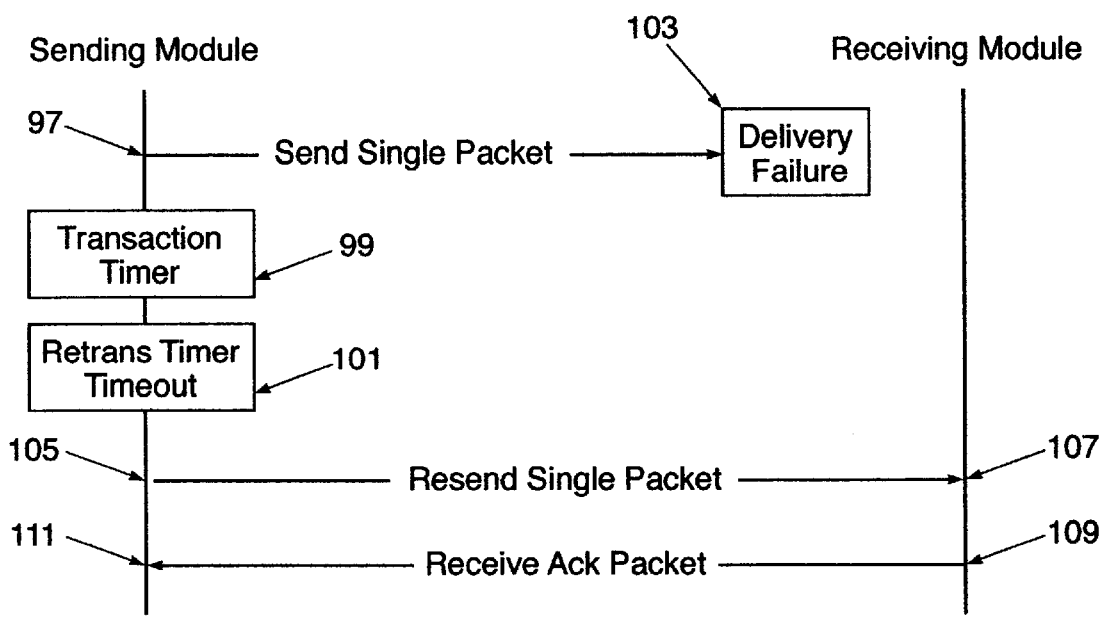
FIG. 7 illustrates the flow diagram of a transmission of a Single Packet message with packet loss and subsequent retransmission.

FIG. 7 illustrates the process of a Single Packet successful retransmission after an initial packet loss, or transmission failure. The sender sends 97 a single Packet. The sender then starts a Transaction Timer 99 and a separate Retransmission Timer 101 as soon as the Single Packet is sent. In this drawing, the transmission fails 103. Because the receiver module does not send an Acknowledgment Packet by the time the Retransmission Timer 103 expires, the sender module resends 105 the Single Packet, with the same sequence number, and restarts the Retransmission 101. In this example the retransmission is successfully received 107 and an Ack packet is sent 109 by the receiving module and received 111 by the sending module. Timing out of the retransmission timer and resending of the data packet would continue until an Acknowledgment Packet is received by the sender or the Transaction Timer 99 expires. If the Transaction Timer 99 expires, the transmission is aborted as a failure and the maximum failuire count is reached a state change will then be implemented for that channel object, closing that circuit path. Another wireless transmission means will be tried for sending the packet.

Figure 8:
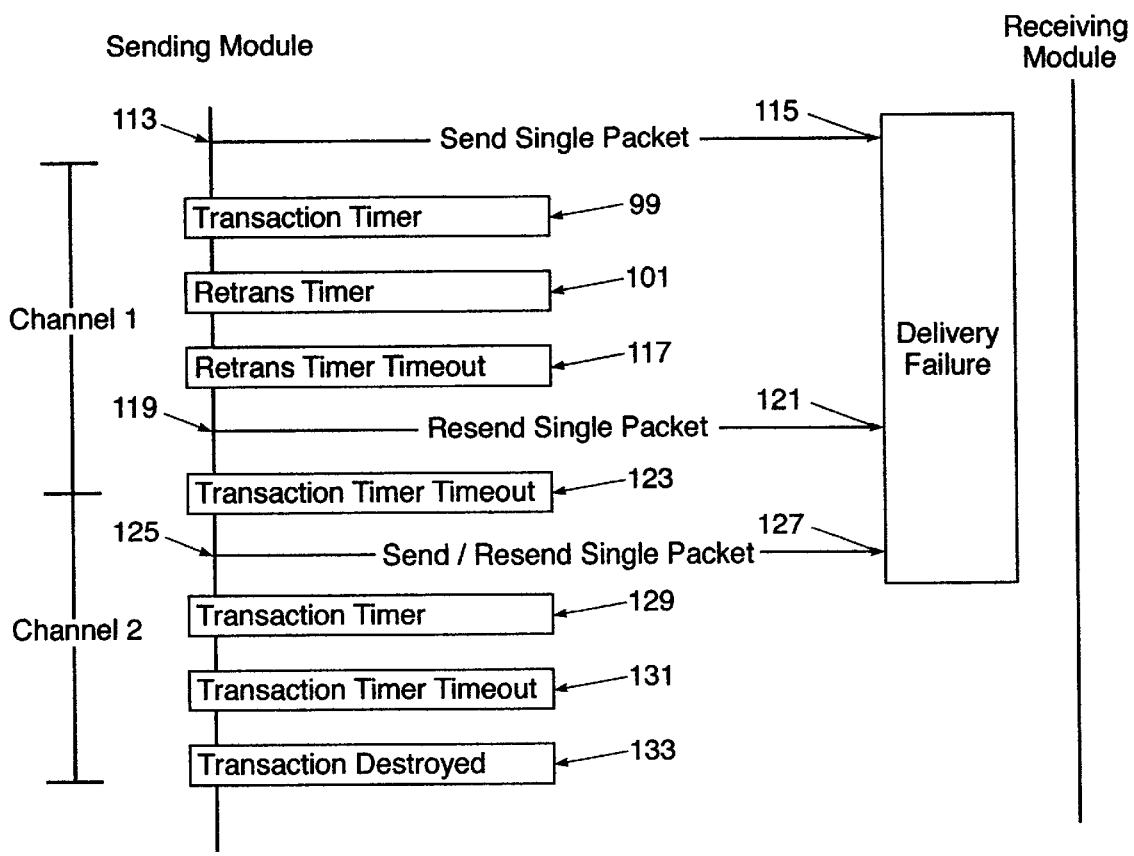
FIG. 8 illustrates the flow diagrams of the unsuccessful transmission of a Single Packet message where all retransmissions of the packet are lost and the transaction times out.

FIG. 8 illustrates the flow of a Single Packet transmission that failed. The sender module sends 113 a Single Packet which begins the Transaction Timer 99 and Retransmisson timer 101. Send 113 fails 115 and Retransmission timer expires 117. The sender resends 119 the Single Packet with a second failure 121. The Transaction Timer expires 123 and the transmission is aborted. A delivery failure count is incremented by the sending Com Object for that channel. The Channel Manager Object hands the packet to the next highest priority channel for retransmission 125. This transmission also fails repeatedly 127. Upon expiration 131 of the second Transaction Timer 129, the channel failure count for that channel is incremented.

Once all transmissions have failed the transaction is then destroyed 133 and, if the failure has incremented to a maximum amount on all channels, the selected circuit will be shut down and connections to the remote terminal and the server being closed to allow the selected applications to denote communications failure in the appropriate manner to the user.

Figure 9:
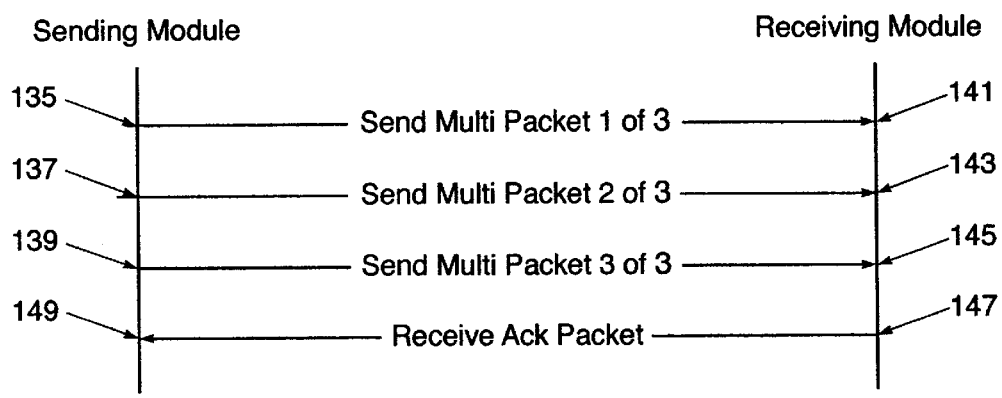
FIG. 9 illustrates the flow diagram of a successful transmission of a Multi Packet message.

FIG. 9 illustrates a successful transmission of a multi B packet message. The sender interchange side Channel Object encapsulates the data into separate Multi Packets to be sent with successive sequence numbers. The Total Packet Number field is included in the first Multi Packet sending 135 to tell the receiver module how many packets to expect. The Packets are then sent serially 137, 139. In the figure, each packet is received 141,143,145. The receipt of the last packet 145 has the protocol issue a signal to check for missing sections of the data transmission. If all of the data packets are received successfully, the receiver module sends an Acknowledgment Packet 147 which is then received 149 by the sender module. No change of state takes place.

Figure 10:
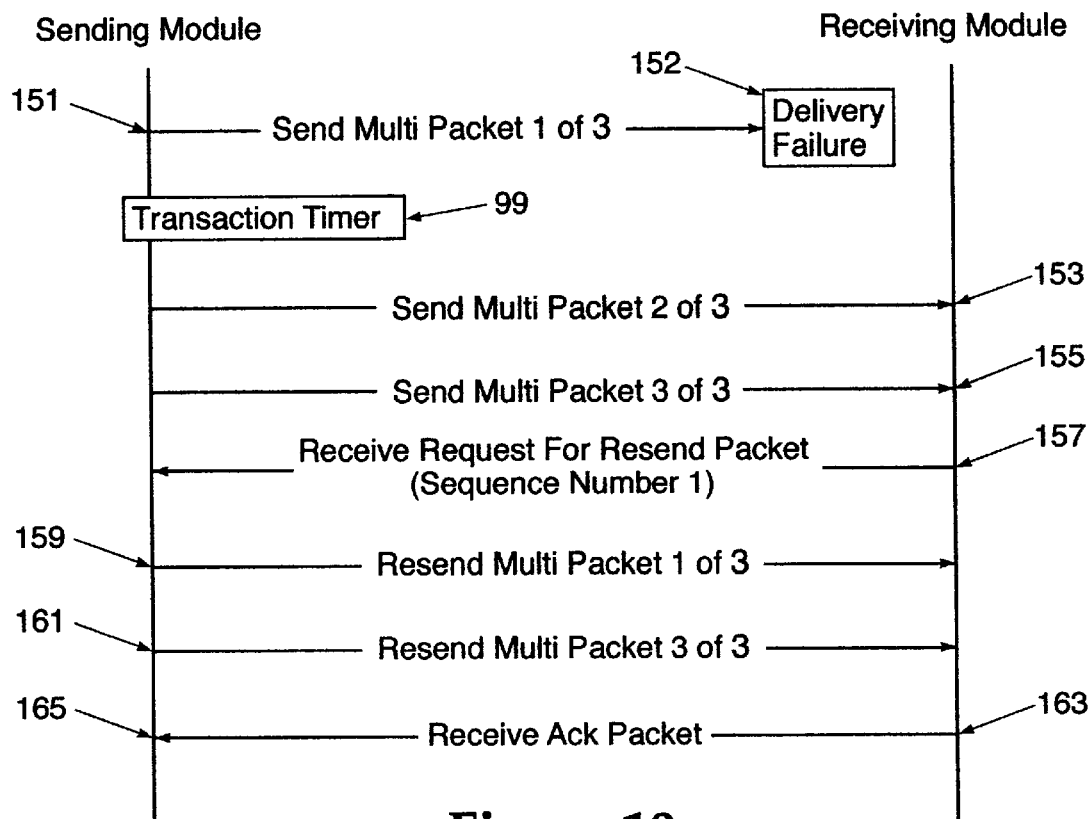
FIG. 10 illustrates the flow diagram of a transmission of a Multi Packet message with packet loss, the determination of the missing packet data section and the retransmission of the missing packet data sections.

FIG. 10 illustrates the flow of a successful Multi Packet transmission with one packet transmission failure. The Sender module sends a first Multi Packet 151. This action starts the Transaction Timer 99. The first packet fails to arrive 152 at the receiver module. Second and Third packet sends are received successfully 153, 155. Each packet conveys how many Multi Packets there are in the message. If the last packet in the sequence is received 155 and any preceding packets are missing, in this case the Delivery Failure 152 of the first packet, the receiver sends a Resend Packet 157 specifying, in the Data Payload field, which packets are missing. Upon receiving the Resend Packet, the sender resends the missing first packet 159 plus the last packet 161 of the sequence. The resend is transmitted successfully and the receiver module transmits an Acknowledgment packet 163 which is received. The sender terminates the transmission upon receipt of the Acknowledgment Packet 165.

During the transmission of a Multi Packet sequence, the Transaction Timer 99 is running and the sender module aborts the transmission as a failure if the Transaction Timer (D) expires before the total transmission can be completed. State changes may be initiated and the message is scheduled for transmission over an alternate wireless transmission means.

Figure 11:
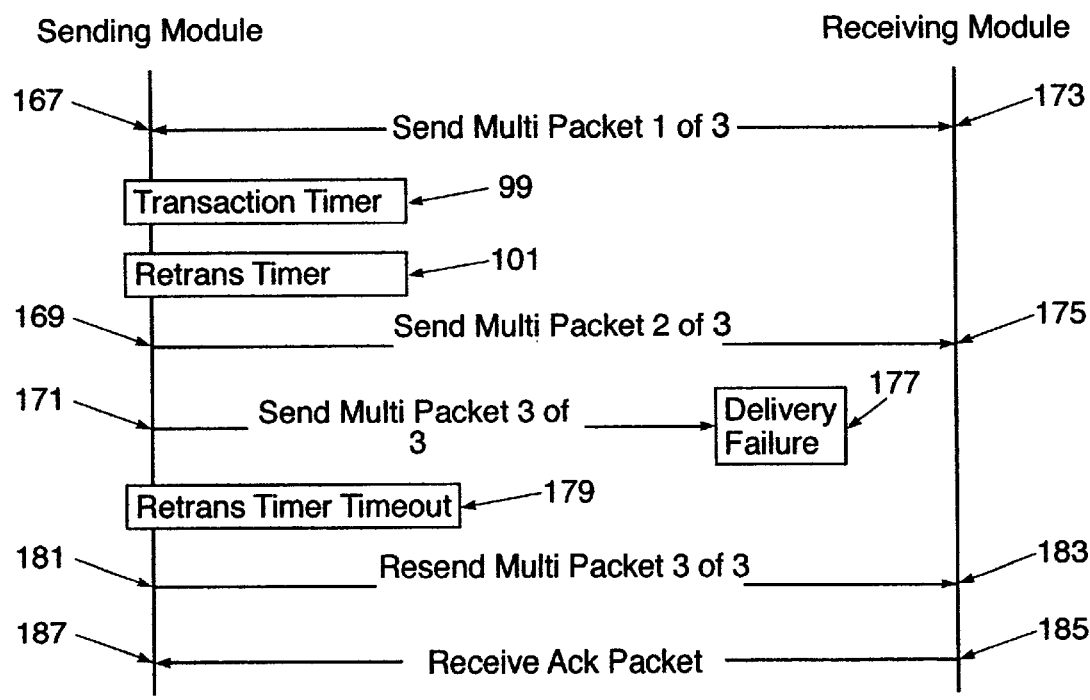
FIG. 11 illustrates the flow diagram of a transmission of a Multi Packet message with last packet loss.

FIG. 11 illustrates the flow of a Multi Packet transmission with a last packet transmission failure. The Sender sends a message in three Multi Packets 167,169,171. The first send 167 starts the Transmission Timer 99 and Retransmission Timer 101. Packet 1 of 3 and Packet 2 of 3 are successfully received 173,175. But the last packet, which carries the signal to check for missing packets, is lost during transmission 177. Therefore, the retransmission timer of the sender is relied upon for successful delivery of the message. After the Retransmission Time has expired 179 the last packet is resent 181. Upon receipt 183 of this last packet by the receiver module, the receiver checks for missing packets and sends an Acknowledgment Packet 185 if all the packets have been successfully received. If any other packets are missing, the receiver of course sends a Resend Packet specifying the packets to be resent as described previously.

Figure 12:
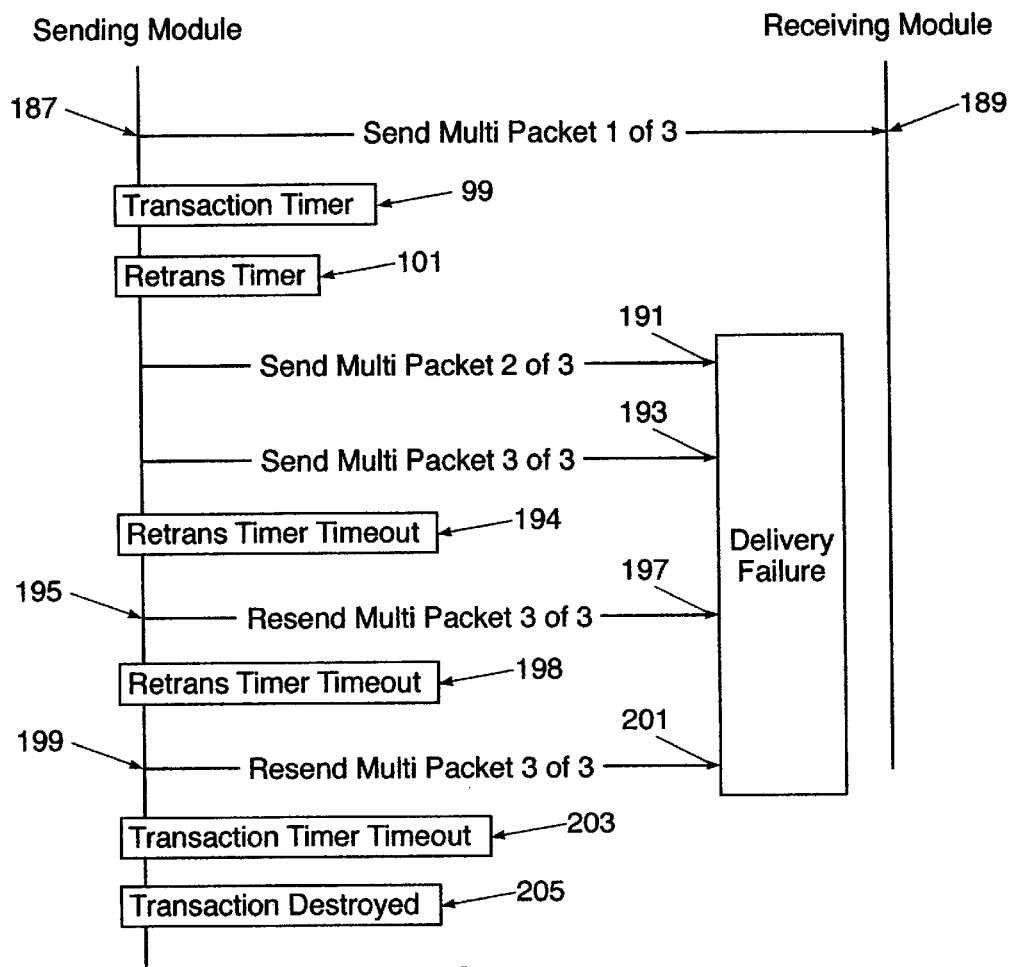
FIG. 12 illustrates the flow diagram of the unsuccessful transmission of a Multi Packet message where all retransmissions of the packet are lost and the transaction times out.

FIG. 12 illustrates the flow of a Multi Packet transmission that was unsuccessful. The sender module sends a first Multi Packet 187 which begins the Transaction Timer 99 and Retransmission timer 101. In the situation shown the first Packet of the Multi Packet Sequence 1 of 3 arrives at the receiver module successfully 189. Sequence Number 2 of 3 and Sequence Number 3 of 3 experienced Delivery Failure 191,193, respectively. When the Retransmission Timer 101 Timed Out 194, or expired, Packet Sequence Number 3 of 3, the last packet, was resent 195, restarting the retransmission timer 101. This transmission also failed 197. When the restarted Retransmission Timer 101 again Timed Out 198, Packet Sequence Number 3 of 3 was resent 199. This transmission also failed 201. The Transaction Timer expired 203 and the transaction was aborted 205. The failure count for that channel is incremented and the Channel Manager Object will schedule the message for resending through the alternate wireless transmission means.

State Changes

As previously mentioned, the wireless control protocol is implemented as a state machine controlling the operational states of the Channel Objects. There are three operational states for a channel object and two transitional states. The operational states are OPEN, CLOSED, and OFFLINE. The transitional states, used to denote transitions between the operational states, are OPENING and CLOSING. The OFFLINE state, or channel object status, occurs when a network segment has failed and is unlikely to resume communication without intervention. An example of such failure could be the physical failure of a wireless transmission apparatus in the controller modules, such as a broken wire to the antenna or the like. The OPEN state exists when the entire network segment is operating normally. CLOSED is a channel object status in a network segment where communication is likely to resume without intervention, and is in response to an OFFLINE state in another part of the circuit. As an example, if the terminal side channel object on the server controller was OFFLINE as described above, the Remote Terminal control module channel objects would be in CLOSED state. The two transitional states, CLOSING and OPENING, indicate the movement from one operational state to another, and propagate their message to change operational states throughout the signal chain until receipt of an acknowledgment signal from a terminal.

Figure 13:
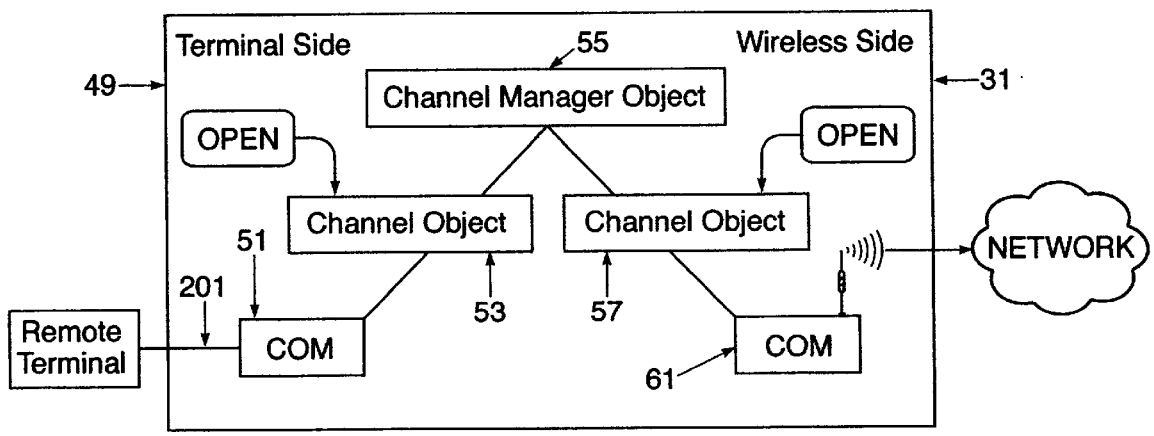
FIGS. 13–15 illustrate examples of state propagation between Side A and Side B of a channel manager object of a controller module.
Figure 14:
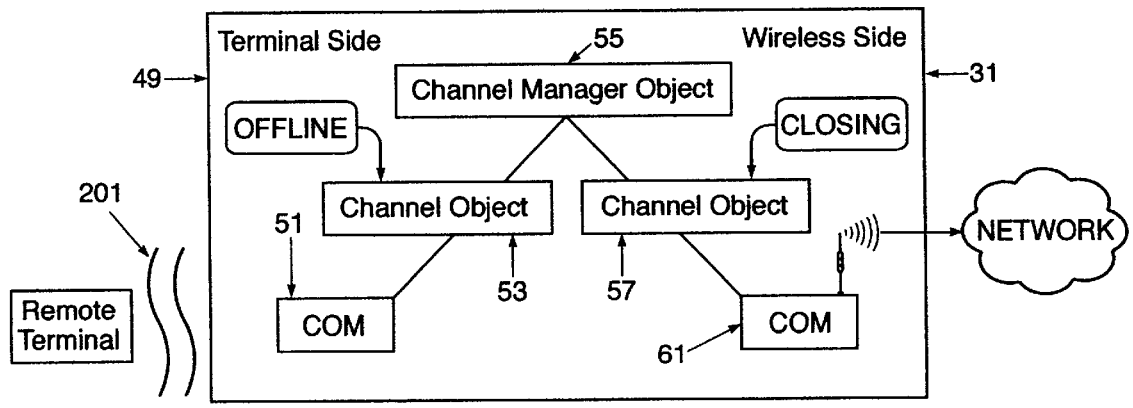
Figure 15:
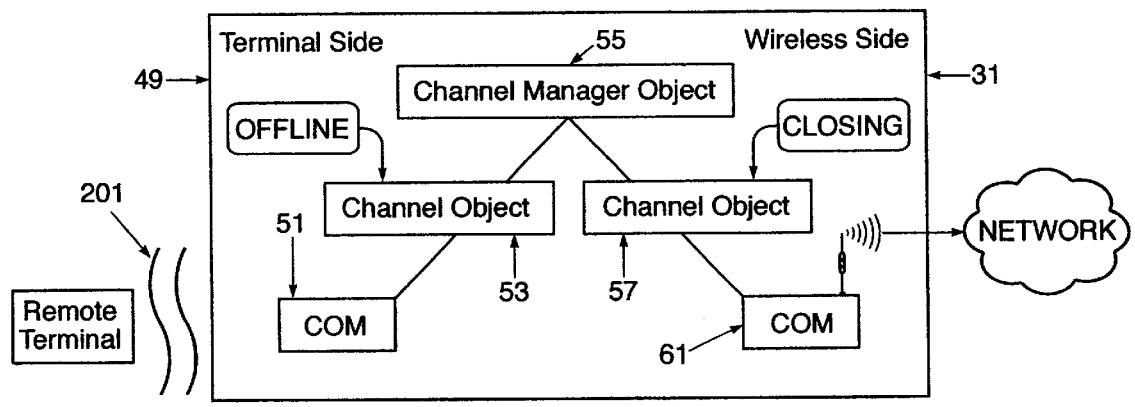

FIGS. 13–15 illustrates an example of state propagation through the Channel Objects 53,57 in a terminal control module, e.g. the Remote Terminal control module 31, between the channel objects of the interchange side and the channel object of the terminal side, in diagram form. One interchange side channel object will be described for simplicity sake. FIG. 13 illustrates the normal operating condition, with both sides Channel Objects 53,57 OPEN and able to send or receive data. FIG. 14 illustrates that there has been some type of connection failure 201 on the terminal side, e.g. a cut cable, destruction of the Remote Terminal, or other physical cause of failure that has caused the terminal side Com Object 51 to place the terminal side Channel Object 53 in an OFFLINE state. When the Channel Manager Object 55 polls the terminal side channel object 53 and receives no acknowledgment, it discovers the OFFLINE state and closes the interchange side channel object, as there is no communication through the terminal side of the module on that channel path. When the interchange side Channel Object 53 receives the Channel Manager Object command to close, it proceeds to go to a CLOSING state and send a Token Packet with a CLOSE command to it's paired channel. The Closing state, like the other transition state, Opening; is propagated throughout the rest of the signal path until a terminal acknowledges receipt, at which time the Channel Objects move to the CLOSE operational state. FIG. 15 illustrates that the CLOSE state is propagated to the corresponding server control module wireless network segment by sending the CLOSE command Token Packet over the wireless transmission means. Once the server control module Acknowledges receipt of the CLOSE command, the remote terminal interchange side channel 57 moves to the CLOSE state. The server module Channel Manager Object (67, FIG. 3) then propagates the close command to its terminal side channel object by sending an Acknowledgment Test Token. There is no communication over this channel path until the OFFLINE state is reversed. Repeated transmission failures to this Remote Terminal channel may signal the server to issue a message to check on the specific location Remote Terminal.

Figure 16:
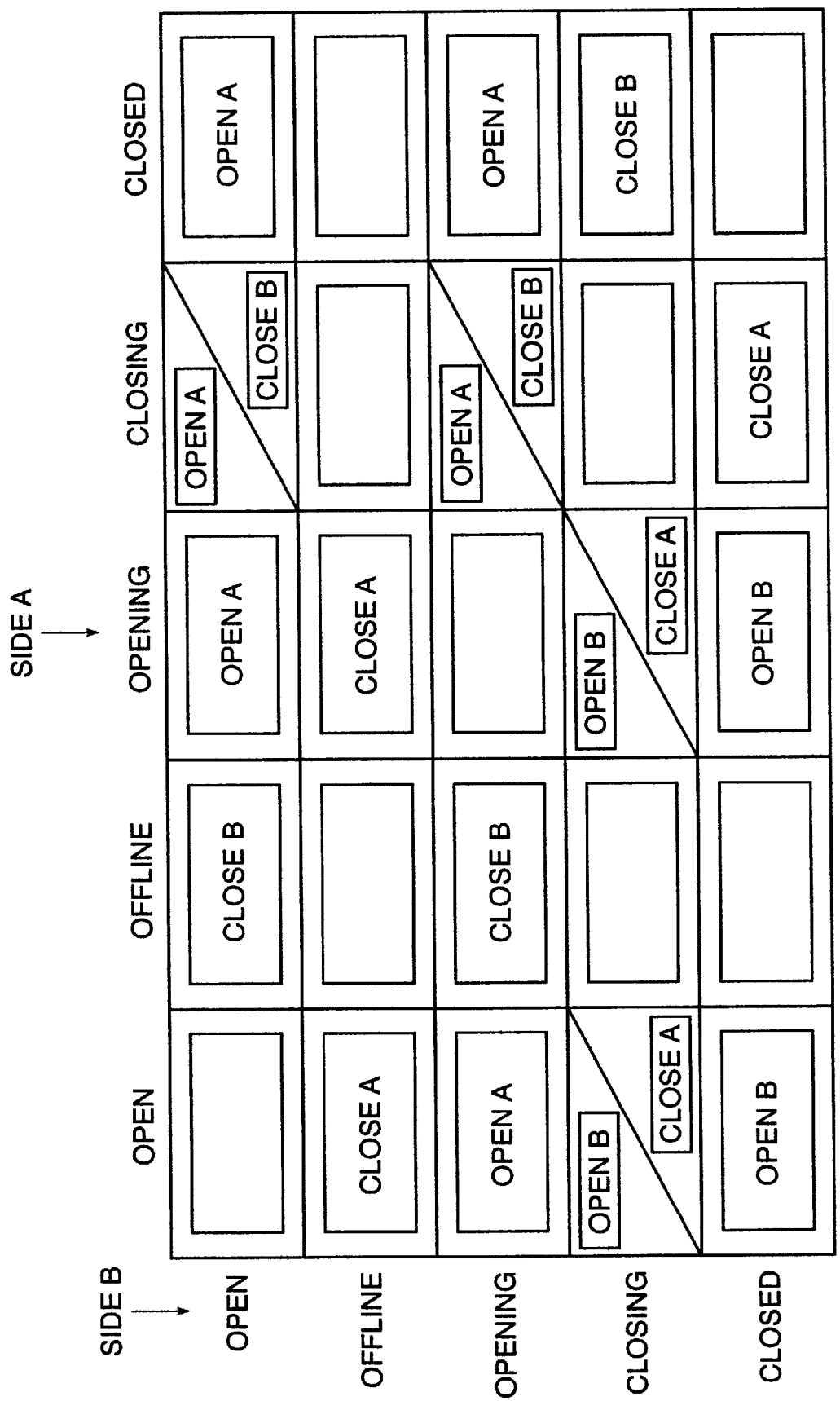
FIG. 16 illustrates in table form state propagation action between Side A and Side B of a channel manager object.

FIG. 16 illustrates in table form the possible propagation actions in response to state changes between Side A, the X axis, and Side B, the Y axis. Essentially FIG. 14 is a look up table for the Channel Manager Object. In response to state changes in the channel objects within a module, e.g. side A could be terminal side and side B could be the interchange side; the Channel Manager Object will look at the change in status for a channel object on one side (axis) and the current status of the other side (axis) and take the action listed in the box where the axes cross. An empty box means take no action. The double boxes provide two options for action. The action selected depends on which side (A or B) last changed. For instance, if the device is in a CLOSING/OPEN state, the action taken depends on if side A just moved to Closing or if side B just moved to OPEN. If it was side A that just changed, then the Channel Manager Object would choose the bottom option, CLOSE B. If side B was the side to just change, it would choose the upper box and OPEN A.

By following the teachings of the present invention the ordinarily skilled artisan will derive means and methods for a reliable real time redundant wireless transmission system between multiple system remote terminals and server terminals of proprietary design.

While the present invention has been described in terms of a preferred embodiment, many variations will become apparent to the ordinarily skilled artisan upon study of the teachings herein. The present invention is therefore intended to be limited only by the appended claims.

We claim:

1. Apparatus for transmission in a system including a signal path having an upstream server terminal and a downstream Remote terminal of proprietary host language protocol, comprising:
   a) a signal chain including;
   b) a server terminal controller downstream of and in signal communication with the server terminal;
   c) a Remote terminal controller upstream of and in signal communication with the Remote Terminal; each terminal controller having a terminal side and a interchange side of its signal chain;
   d) a signal transmission carrier of different protocol than the proprietary host language between the Server terminal controller and the Remote terminal controller;
   e) each terminal controller having a terminal side with paired Com and Channel Objects communicating with one of the Remote Terminal or server terminal, and a interchange side having a plurality of Channel Objects communicating with a Com Object dedicated to each signal carrier protocol;
   f) each terminal controller having a Channel Management Object interfacing between the terminal side paired Com and Channel Objects and the interchange side plurality of Channel Objects;
   g) the Server and Remote terminal controller interchange side Com Objects interfacing with the plurality of signal transmission carriers;
   h) the terminal side of Com Objects doing protocol translation, including adding/subtracting terminal communications headers, and message packetization and encryption between the Remote terminal and the Remote terminal controller, and between the Server and the Server terminal controller, and the terminal side Com Objects monitoring their connection to the terminals;
   i) the interchange side Com Objects acting to mux/demux messages intended for the terminal controllers or their associated system terminals, or both, and adding or subtracting signal carrier protocol;
   j) the channel objects monitoring message transmission/failure activity and acting as gates in the signal chain and having multiple operational states including: OPEN, CLOSE, OFFLINE; and two transitional states: OPENING and CLOSING; and the interchange side channels adding/subtracting terminal controller protocol message headers, timing message transmissions, issuing resend requests, assembling and acknowledging received messages; and controlling state changes within the channel;
   k) the Channel Management Object polling and monitoring the Channel Object states and assigning them to carry messages to said states, and propagating said state changes along said signal path.

2. The apparatus of claim 1 wherein the signal transmission carrier is wireless.

3. The apparatus of claim 1 wherein there are a plurality of signal transmission carriers.

4. The apparatus of claim 3 wherein the plurality of signal transmission carriers are wireless.

5. Apparatus for redundant transmission in a system including a signal path having an upstream server terminal and a downstream Remote Terminal of proprietary host language protocol, the path having a server terminal leg, a Remote Terminal leg, and an interchange transmission leg; comprising:
   a) a terminal controller having
      a terminal side and a interchange side,
      a Com Object and Channel Object pair on the terminal side
      a Com Object and multiple Channel Objects on the interchange side
   b) a Channel Manager Object between the terminal side channel and the interchange side multiplicity of channels;
   c) the Com Object doing message header translations between protocols & mux/demux of messages between multiple Channel Objects;
   d) the Com Objects being placed at juncture points with communications outside the controller;
   e) the Channel Objects being placed between the Com Objects and the Channel Manager Object
   f) the Channel Objects monitoring message failure, and changing operational states to act as gates in signal path;
   g) the Channel Manager Object doing polling and selection of channels.

6. A method of transmission in a signal path having an upstream server terminal and a downstream Remote Terminal of proprietary host language protocol, comprising:
   a) establishing a server terminal controller connection with a server;
   b) establishing a remote terminal controller connection to the Remote Terminal;

c) receiving a Remote Terminal message;

d) stripping the Remote Terminal message down to produce data message with only data and address information;

e) packetizing and encrypting the data message;

f) adding a terminal controller header to the data message to produce a terminal controller message;

g) selecting a signal carrier and assigning the terminal controller message to transmission on said signal carrier;

h) adding a signal carrier header to the terminal controller message to create a signal carrier message;

i) transmitting the signal carrier message on the selected signal carrier to the server terminal controller;

j) stripping the signal carrier header to recreate the terminal controller message;

k) checking the server address in the terminal controller message;

l) assigning the message to the intended server channel and stripping the terminal controller header; and m) acknowledging receipt of the message by the server terminal controller to the remote terminal controller.

7. The apparatus of claim 6 wherein the signal transmission carrier is wireless.

8. The apparatus of claim 6 wherein there are a plurality of signal transmission carriers.

9. The apparatus of claim 8 wherein the plurality of signal transmission carriers are wireless.

10. A method of redundant data transmission in a signal path having an upstream server terminal and a downstream Remote Terminal of proprietary host language protocol, comprising:

a) packetizing and encrypting a data message;

b) adding a terminal controller header to the data message to produce a terminal controller message having: packet type, sequence number, and circuit identifier information, as well as said data message;

c) tracking the state of transmission capability on each channel, including counting failed transmissions, and reporting the state of transmission capability;

d) adding a wireless carrier header to the terminal controller message to create a wireless message;

e) transmitting the wireless message on a selected wireless carrier to the server terminal controller;

f) stripping the wireless header to recreate the terminal controller message;

g) checking the server address in the terminal controller message;

h) assigning the message to the addressed server channel and stripping the terminal controller header; and i) acknowledging receipt of message by the server terminal controller to the remote terminal controller; and j) opening and closing channel paths based on the receipt of the message.

11. The method according to claim 10 further comprising the step of validating the identity of the sender of the message when receiving the transmitted message.

12. Apparatus for managing a wireless, secure, real-time, network for a proprietary interactive data transfer network having a remote terminal and a server, comprising:

a) means for transceiving data messages from the Remote Terminal in a first format;

b) means for removing the first format from the data message to create a bare message;

c) means for packetizing the bare message;

d) means for encapsulating the bare message;

e) means for encrypting the bare message;

f) means for adding a second message format to the bare message to create a second format message;

g) means for selecting a signal transmission format for sending of the second format message;

h) means for adding a third signal transmission format to the second format message to create a signal transmission message;

i) means for sending the signal transmission message via the selected signal transmission format;

j) means for monitoring reception of the translated data by the server; and k) means for opening or closing data paths based on the monitored reception.

13. The apparatus of claim 12 wherein the means for selecting a signal transmission format for sending of the second format message further comprises means for selecting among a plurality of signal transmission formats.

14. The apparatus of claim 12 wherein the signal transmission format is a wireless signal transmission format.

15. The apparatus of claim 14 wherein the means for selecting a signal transmission format for sending of the second format message further comprises means for selecting among a plurality of wireless transmission formats.

16. A method of transmission in a signal path having an upstream server terminal and a downstream Remote Terminal of proprietary host language protocol, comprising:

a) establishing a server terminal controller connection of a first protocol with a server;

b) establishing a remote terminal controller connection of a second protocol to the Remote Terminal;

c) receiving a Remote Terminal message;

d) packetizing and encrypting the data message;

e) selecting one from a plurality of signal paths based on availability or reliability, or both, of packet transmission between the remote terminal and the server, wherein each one of said plurality of signal paths is associated with a different wireless format;

f) sending the message over the selected signal path; and g) acknowledging receipt of message by the server terminal controller to the remote terminal controller.

17. The method according to claim 16 wherein the first and second protocols are different protocols.

18. The method according to claim 16 further comprising:

monitoring receipt of the acknowledging message by the remote terminal controller.

19. The method according to claim 18 further comprising:

closing the selected signal path if no acknowledging message is received.

* * * * *